Nov. 8, 1932.  F. L. MORSE  1,887,137
DRIVE CHAIN
Filed Sept. 26, 1927  2 Sheets-Sheet 1
Fig:1.
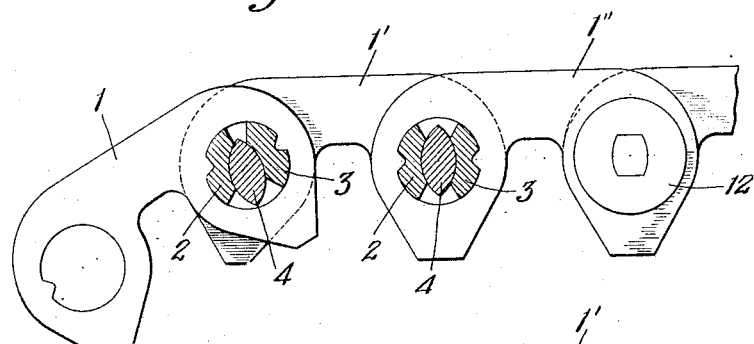
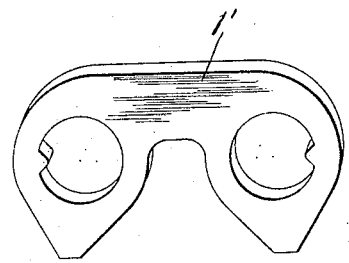
Fig:2.
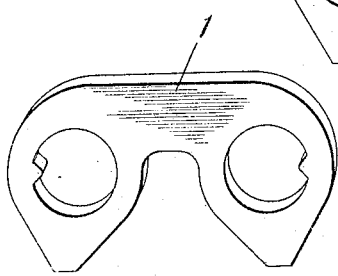
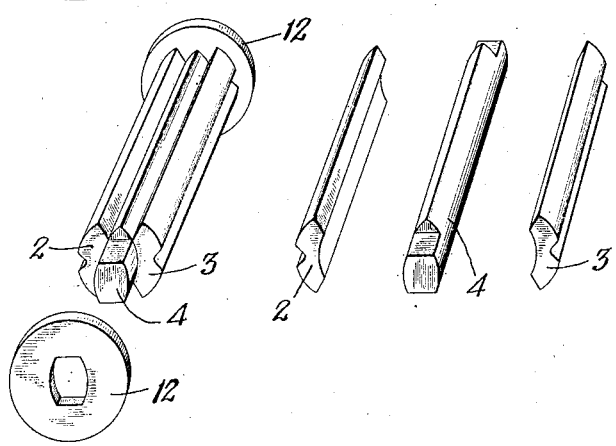
INVENTOR
Frank L. Morse
BY
Synnestvedt & Lechner
ATTORNEYS Nov. 8, 1932.  F. L. MORSE  1,887,137
DRIVE CHAIN
Filed Sept. 26, 1927   2 Sheets-Sheet 2

INVENTOR
Frank L. Morse
BY
Symestvedt & Lechner
ATTORNEYS

Patented Nov. 8, 1932

1,887,137

UNITED STATES PATENT OFFICE

FRANK L. MORSE, OF ITHACA, NEW YORK, ASSIGNOR TO MORSE CHAIN COMPANY, OF ITHACA, NEW YORK, A CORPORATION OF NEW YORK

DRIVE CHAIN

Application filed September 26, 1927. Serial No. 221,898.

This invention relates to chains used in the transmission of power and particularly to chains of the so-called "silent" type, and has for its primary object the provision of improved joints for such chains calculated to reduce whipping and vibration to an unobjectionable amount, thus producing a drive chain which is quiet and smooth in operation and in which loss of power attributable to vibrations is eliminated.

Drive chains of the above type generally used prior to my invention have transmitted power efficiently and satisfactorily under most conditions, but under special and peculiar conditions, they have been found to set up periodic vibrations of great intensity, resulting in noise and loss of power. These chains have, in general, had joints of either the anti-friction rocker type, or of the sliding friction bush or pin type; but in either case the joints have been designed primarily to operate with a minimum of friction.

In this invention the joints are of the sliding friction type, and are, in general, distinguished from the usual friction joints in that whereas the latter have been developed along the lines of a round pin or bushing having rotation about a central point, so as to involve a minimum of sliding friction and rubbing velocity, my invention places in the pintle holes non-round pins, which, though they may have arcuate bearing surfaces, yet, in general, have their centers of curvature located elsewhere than at the center of the pintle hole. With such a construction, the pintle appears to have more of an oscillatory than rotary motion (though it is possible to closely control the actual center of articulation, as will be described), the sliding surfaces have a greater action than in the previous constructions, and it is possible to apply and direct the friction forces so as to appreciably dampen vibration or whipping of the chain between sprockets, and obtain smoother and quieter action. The oscillating pintles thus may act somewhat as snubbers under certain conditions.

Another object of the invention is to control the motion of the center of articulation of the chain as it goes on and off the sprockets, so as to regulate the slight periodic motions and variations in tension resulting therefrom. In prior constructions the center of articulation has either not shifted at all when the chain is bent, as in the case of the round pin, or has moved outward so as to accentuate the initial whipping motion. The present invention, on the contrary, is distinguished by the fact that the center of articulation moves inward as the joint bends, thus offsetting the initial outward throw of impact, and the joint lengthens the pitch slightly, so to speak, to compensate longitudinal variations and diminish periodic variations in tension. Another object in controlling this center of articulation is to permit reasonable clearances in the pintle hole and parts.

A further object of the invention is to arrange the pintle parts so as to allow wider bearing surfaces of greater radius of curvature, so as to better withstand the shock of the driving forces.

How the foregoing, together with such other objects and advantages as may hereinafter appear, or are incident to my invention, are realized, is illustrated in preferred form in the accompanying drawings, wherein—

Fig. 1 is a side elevation of a portion of a chain embodying my improvements with two of the joints appearing in section and illustrating in a general way, the manner in which the pintle parts of the joint move as the chain bends;

Fig. 2 is an exploded view of the parts in Fig. 1,—only two of the numerous link plates being shown,—and the pintle parts being shown both as they lie in contact and also separated to show their individual construction;

Figure 3:
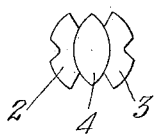
Fig. 3 is a section through the form of joint illustrated in Fig. 1 in which the side bushing parts are in general perpendicular to the line of pull, i. e., not tipped in relation to each other.

The foregoing figures illustrate a few of the many possible configurations having the general characteristics of this invention, and, by way of example, I will first take up the description of the form shown in Figs. 1, 2 and 3, so as to explain the general principles of construction.

Referring now to Fig. 1, it will be understood that the chain is composed of a series of multiplate links 1, 1', 1'', etc., of which only a few are shown, as the present invention is concerned particularly with the construction of the joints. In Fig. 1 some of the washers 12 normally covering the joints are removed so as to show the form of the pintle parts, and the various parts are also shown separated in Fig. 2. In the form shown in Fig. 1 and Fig. 2, each joint consists of an arcuate bushing part 2 securely fixed to one link so as to move therewith, another arcuate bushing part 3 secured to the next link so as to move with that link, and a double convex or lenticular pintle member 4 located between the bushing parts 2 and 3. The curvature of the sides of the pintle member 4 conforms to that of the bushing parts 2 and 3 so that it may turn or move relative thereto with a sliding motion, the turning occurring about the centers of curvature of the arcs. When the chain is bent, the pintle member 4 appears to slide or float up and down in the joint, and for that reason the pintle member 4 will hereinafter be termed the floater 4. The floaters 4 and the side bushing parts 2 and 3 extend across through the various link plates composing the chain in the usual manner. When the chain is straight, as when it is between sprockets, the floater 4 is normally at the upward end of its travel, as shown at the right in Fig. 1, and the tension of the chain is transmitted through the floater 4 by the bushing parts 2 and 3 pressing on each side. When the links are bent in going on a sprocket, the outer portions, i. e., those away from the center of the wheel, of the bushing parts 2 and 3 swing closer together, and as the angle of pressure is greater than the angle of friction, the floater travels inward, i. e., toward the center of the wheel. The bushing parts 2 and 3 maintain their contact with the floater 4 as it moves, inasmuch as the radius of curvature of each bushing part is the same as the radius of curvature of the contacting face of the floater, and the bushing parts 2 and 3 and the floater 4 are free to adjust themselves to each other.

Taking up the articulation of the joint more in detail, it will be seen that the angular motion between the links may be considered as being partially due to the floater 4 turning relative to one of the bushing parts 2 or 3 and partially due to the other bushing part 3 or 2 turning relative to the floater 4. This turning is accomplished by each moving member sliding along on its arcuate face relative to the adjacent member. It will thus be seen that if the floater 4 slides 15° of arc relative to one of the bushing parts 2 or 3, and the other bushing part 3 or 2 slides 15° relative to the floater 4, the total bend or angular motion between the links attached to the side bushing parts will be 15° + 15°=30°. Each of these turning or sliding motions takes place about the center of curvature of its arcuate face. As will be seen from an inspection of Figs. 1, 3, 6 and 9, there are two different centers of curvature, A and B, about which the motion may take place, and it is the combined effect of motions about these two points that determines the motion of the links relative to each other.

It is important to consider the resultant motion of the effective center of articulation as the chain bends in going on and off the sprockets in order to follow the actual path of the chain in its travel and also to determine what shortening or lengthening of pitch takes place, if any, with its corresponding effect on the tension, velocity, and periodic vibration of the chain. It is also important to determine the relative motions of the parts composing the joint, in order to determine what size hole and clearances must be allowed to permit the desired motion to take place.

Figure 6:
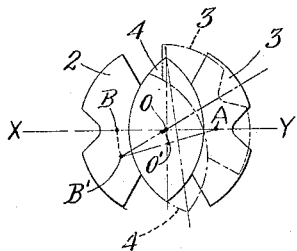
Fig. 6 is an enlarged geometric diagram illustrating the action of the joint illustrated in Figs. 1, 2 and 3.
Figure 9:
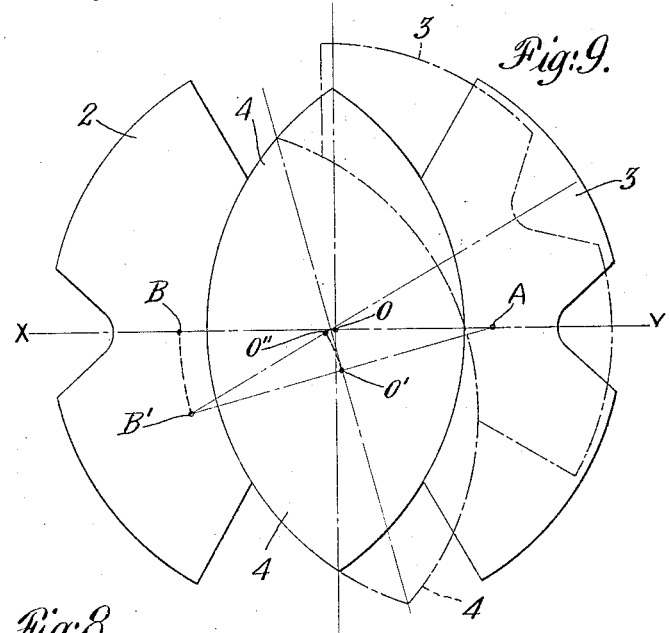
Fig. 9 is a geometric view similar to Fig. 6 but on a larger scale so as to show the movement of the center of articulation.

Referring now to Figs. 6 and 9, which show in the form of a geometric diagram the operation of one simple form of joint, the reference numeral 2 indicates the arcuate bushing part which is secured to and moves with one link of the chain; the reference numeral 3 indicates the arcuate bushing part which is secured to and moves with the cooperating link of the chain, and 4 indicates the double convex or lenticular pintle member or floater which lies between them. Assume, for example, that it is desired to bend one link 30° in relation to the other. Since the bushing parts 2 and 3 are secured to their respective links, this means that the bushing part 3 is to be swung 30° relative to the bushing part 2. If the parts 2 and 3 are equally free to turn on the floater 4, as is normally the case, the motion will occur by the part 3 turning 15° relative to the floater 4, and the floater 4 and the part 3 together moving another 15° relative to the part 2,—making the total motion 30° between the part 2 and the part 3. Though the motion of the parts may be simultaneous, it can be followed in the geometric diagram by taking them up one after another. The center of curvature of the bushing part 2 and the left hand face of the floater 4 is originally located at A on the center line X—Y; and the center of curvature of the bushing part 3 and the right hand face of the floater 4 is originally located at B on the center line X—Y. The resulting center of articulation is located at the start at the point O. Assuming then, for example, that the left hand bushing part 2 is stationary and the other two members 4 and 3 rotating upon it, they will turn as a unit about the center of rotation A an amount, say 15°, until their center line lies in the position AB', and the point O will have swung to the position O', having turned about the center A along the arc O—O'. Constructing the floater 4 in its new position on the axis AB', we find that it is as shown in broken lines in Figs. 6 and 9. Now taking up the motion of the bushing part 3 relative to the floater 4, we swing the bushing part 3 another 15° on the assumption that the floater 4 and bushing part 2 are now fixed relative to each other, and the bushing part 3 alone free to turn. This motion then occurs on the right hand face of the floater 4, with the point B' as the center. The point O' then swings around the center B' up to the position O''. The net effect of the combined motions described had they taken place simultaneously, would have been to move the center of articulation from O to O'' and to bend the links a total of 30°. It will be noted that the center of articulation and the center of the floater have moved to different locations,—the final location of the center of the floater being at O'. It will be seen that each half angle motion has accounted for a travel of the point O along the path O—O'' by an amount proportional to the versine of half the total angle of bend. Referring to Fig. 9, the net result of the motions has been to move the center of articulation inward toward the center of the sprocket and also toward the bushing part 2 which was assumed stationary, thus causing the joint to yield in the direction of pull and thereby effecting a lengthening in the pitch of the chain an amount equal to O—O''.

As is well known in the art, prior friction chain joints have had the effect of shortening the pitch of the chain as articulation occurred in passing on to the sprocket, owing to the angularity they assumed; and while some rocker joints have attempted to compensate for this shortening in certain special cases, they have done so at the expense of a considerable outward movement of the point of articulation, thus exaggerating an undesirable motion while compensating for change of pitch. The present invention, on the contrary, not only lengthens the pitch on entering the sprocket, but draws the point of contact between the line of force and the pitch circle inward—both of which motions are desirable. This combination of motions is, I believe, unique to the type of construction contemplated by this invention, inasmuch as other constructions either shorten the pitch, or the center of articulation moves outward, or both.

Figure 4:
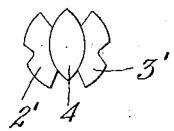
Fig. 4 illustrates another form of joint, in which the side bushing parts are tipped in relation to each other.
Figure 7:
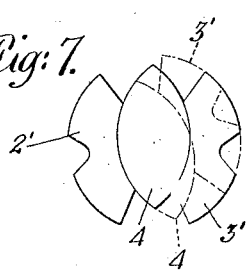
Fig. 7 is a similar diagram illustrating the action of the joint illustrated in Fig. 4.

In the foregoing example the three pintle parts have been considered symmetrically arranged about the vertical and horizontal axes, with the centers A, O, and B in their initial position lying on the same straight horizontal line. It will be noted, however, that the axes AO and OB may be inclined at various angles to the horizontal, so as to give the side bushing parts 2' and 3' an initial tilt, as shown, for example, in Figs. 4 and 7, in which it will be seen that the side bushing parts 2' and 3' are tilted in opposite directions from the vertical. A geometric analysis similar to that just described in connection with Figs. 1, 3, 6 and 9 can be made with reference to Fig. 7.

In some of the drawings the relations have been exaggerated for the sake of clearness, but it will be understood that these are but a few of the innumerable angular combinations in which the parts may be arranged, the angles of inclination and the radii of curvature varying in different installations according to the action desired. The resulting motions, however, can be analyzed along the general lines indicated, and the particular design utilized which is best adapted to the conditions.

While I have in the foregoing described only the double convex sliding friction type of central pintle member, it is possible also to use a pintle member having rocking or anti-friction construction on one side and sliding friction on the other, thus giving rocking friction for some degrees of motion and sliding friction for others. In this case the effective pivot around which the rocking action occurs is along the line of contact, while the center of motion of the sliding friction is at the center of curvature of the sliding faces.

In a lenticular or double convex pintle member such as has been described, the center of curvature of the arcuate face is generally located on the opposite side of the vertical center line from the face itself. Thus, the center of curvature of the left hand face of the floater 4 in Fig. 3 or Fig. 6 is located to the right of the center O, and the center of the right hand face is located to the left of the center O.

Figure 8:
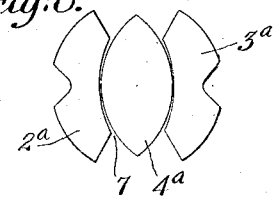
Fig. 8 is an enlarged section of a joint illustrating a slight modification of Fig. 3.

In the foregoing I have referred to the sliding bearing surfaces preferably as being arcuate, with the mating surfaces having the same curvature in order to produce motion about a definite center. It will be understood, however, that this is susceptible to some modification, inasmuch as these surfaces are normally separated by a film of oil, and, consequently, they may have slightly different radii of curvature, to accommodate an oil film of varying thickness, or may have certain portions relieved or cut away to provide additional thickness of film at certain points, or to drive the lubricant in a slightly wedge-shaped form, somewhat in the manner of a Kingsbury thrust bearing surface. One illustration of slightly different shapes of mating surfaces, somewhat magnified, is shown in Fig. 8, in which 2a is one mating face, 4a the other mating face, and the space between them for an oil film is indicated by the reference numeral 7.

Figure 5:
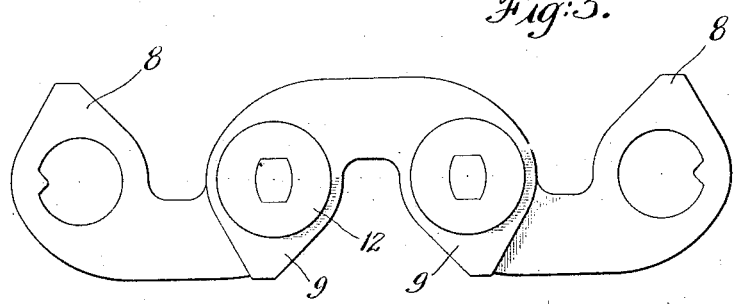
Fig. 5 illustrates a biflex chain, inasmuch as these joints may be used in chains bending in one or both directions.

The foregoing joint constructions may be used not only with the silent type of power chain, such as shown in Fig. 1, but also, if desired, with the ordinary roller type of chain, or with a biflex type of chain, such as shown, for example, in Fig. 5, which has teeth 8 projecting from its back as well as teeth 9 projecting from its front, and is adapted to bend in either direction.

While I have shown various embodiments of my invention, it will be understood that these are only by way of illustration, and that the invention is susceptible of various modifications and adaptations as will be apparent to those skilled in the art without departing from the scope of the invention as defined in the following claim.

I claim:—

In an oscillating joint for chains, the combination of two pintle members having surfaces adapted to turn one on the other with sliding friction about a substantially common center of rotation, the curvature of one surface differing slightly from the curvature of the other surface to provide a tapering space therebetween.

In testimony whereof I have hereunto signed my name.

FRANK L. MORSE.